Nov. 17, 1942.  A. N. FRANCIS  2,302,308
ANTISKID CHAIN
Filed May 8, 1941
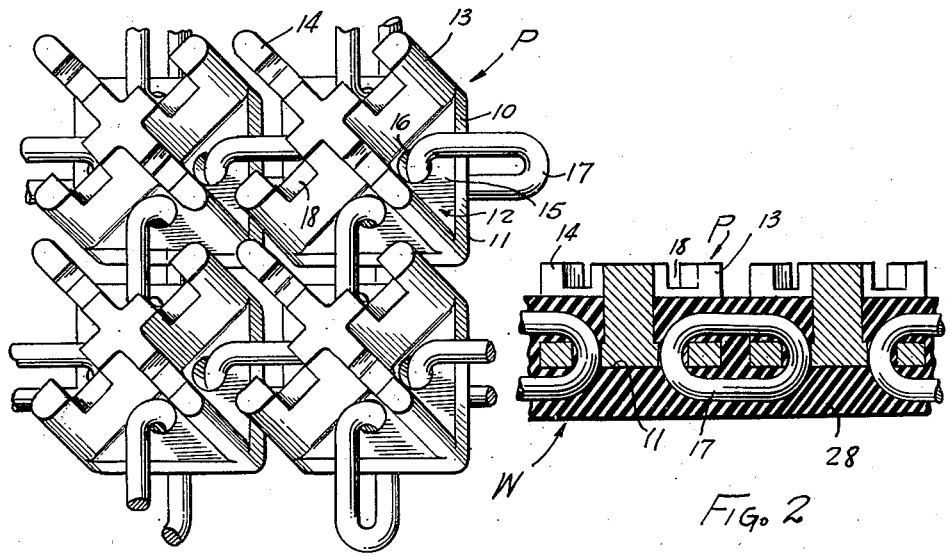
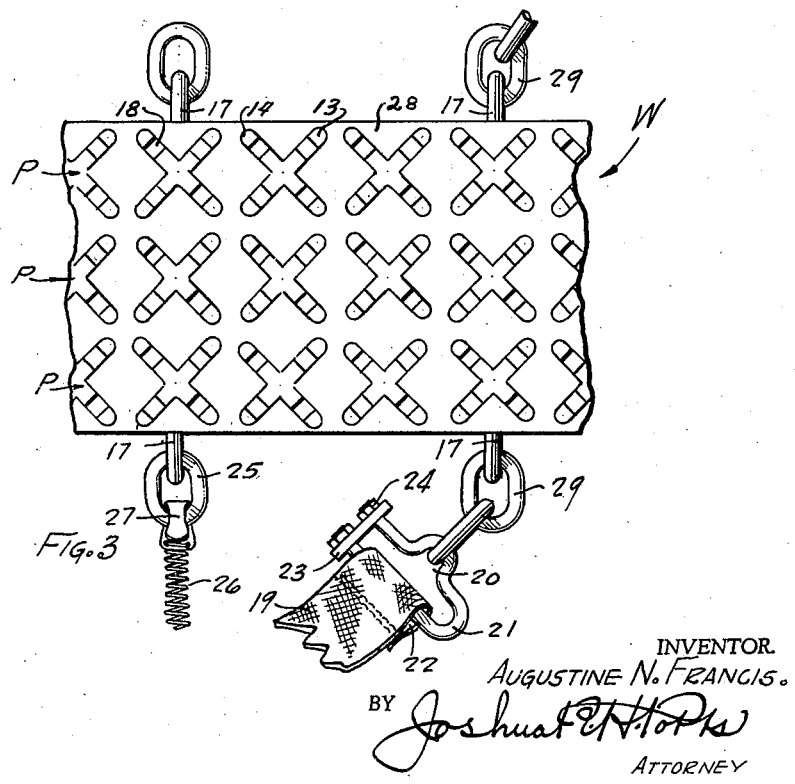
INVENTOR.
AUGUSTINE N. FRANCIS.
BY
ATTORNEY Patented Nov. 17, 1942

2,302,308

UNITED STATES PATENT OFFICE 2,302,308

ANTISKID CHAIN

Augustine N. Francis, Philadelphia, Pa.

Application May 8, 1941, Serial No. 392,419

8 Claims. (Cl. 152—226)

This invention relates to anti-skid chains such as are commonly applied over the traction surfaces of the tires of motor vehicles.

It has long been recognized by those skilled in the tire art that "diamond treads" present decided advantages, both from the viewpoint of affording traction and in presenting a non-skid surface in stopping.

With this well-accepted rule in mind, this invention has in view, as an important object, the provision of an anti-skid chain designed to cover the traction surface of an automobile tire and which presents diamond-shaped recesses, the edges of which are in engagement with the road.

A more detailed object of the invention is the provision of such an anti-skid chain in which every diamond-shaped recess is defined by elements carried by different tread plates. The tread plates are assembled for movement relative to one another, and which would ordinarily be caused by rotation of the tire, together with engagement of the tire with the road surface.

Another important object of the invention is the provision of an anti-skid chain of the character aforesaid which includes a plurality of tread plates, each of which is provided with cross ribs adapted to engage a road. These tread plates are assembled by links to provide a web that covers the traction surface of the tire.

Another object of the invention is the provision of an anti-skid chain of the type above-noted in which the main body portion of the tread plates and the connecting links are embedded in rubber. This rubber which encases the tread plates and links provides a cushion between the tread plates and the tire on which the chain is mounted, and also provides effective cushioning means between the several tread plates.

Yet another object of the invention is the provision of an anti-skid chain of the character aforesaid which includes means for anchoring the same to the wheel that carries the tire.

An important part of this feature of the invention is the provision of optional means which may be employed as occasion demands for tensioning the chain on the tire. The chain is provided with means for including tension springs that extend diametrically across the wheel and which may be effectively positioned as occasion demands.

Various other more detailed objects and advantages of the invention will in part become apparent and in part be hereinafter stated as the description of the invention proceeds.

The invention, therefore, comprises an anti-skid chain that consists of a plurality of tread plates, each of which carries cross ribs designed for engagement with a road surface. The cross ribs on one plate cooperate with the cross ribs on other plates to provide diamond-shaped recesses. The tread plates are maintained in assembled relation by links while both the tread plates and links are embedded in rubber, leaving only the cross ribs free for engagement with the road surface. Means are included for anchoring the chain to the wheel carrying the tire and additional means is provided for tensioning the chain about the tire.

For a full and more complete understanding of the invention, reference may be had to the following description and accompanying drawing, wherein:

Figure 1 is a perspective view showing certain of the tread plates in assembled relation and with the encasing rubber removed, Figure 2 is a detailed sectional view of a portion of the chain, showing the plates and links as embedded in rubber, and Figure 3 is a plan view of a portion of the web making up the chain.

Referring now to the drawing, wherein like reference characters denote corresponding parts, and first more particularly to Figure 1, it will be noted that the chain of this invention is made up of a plurality of tread plates, each of which is referred to in its entirety by the reference character P. All of these tread plates P are substantially alike in structure, and only one of them needs here be described for the purpose of this specification.

It is notable that the tread plates P may be made from any appropriate material, although the invention has particularly in mind the use of a metal which may be molded or cast into the desired shape. Each plate P comprises a base 10 of substantially square formation having the rounded corners illustrated. The base 10 has a so-called inner surface at 11 that is disposed toward the traction surface of the tire, and a so-called outer face 12 that is more remote from the tire. Upstanding from the face 12 of the base 10 are a pair of intersecting ribs 13 and 14. With the plate P cast from a metal, these ribs 13 and 14 will be integrally joined to the base 10.

It is evident that the intersecting arrangement of the ribs 13 and 14 mark off triangularly shaped portions 15 on the face 12 of the base 10. Each of these triangularly shaped portions 15 on the base 10 is formed with an opening 16. A link such as shown at 17 passes through the opening 16 of one plate P and the corresponding opening 16 of the next adjacent plate. Thus, the several plates P are assembled in the web formation illustrated.

It is evident that the outer edges of the ribs 13 and 14 are designed for engagement with the road surface. To the end of enhancing the non-skid qualities of the chain and improving the traction afforded thereby, the outer edges of the ribs 13 and 14 may carry notches such as shown at 18.

The number of plates P which are assembled to make up the complete web of a chain may vary in accordance with the sizes of the particular tires to which a chain is to be applied, and also may depend somewhat on the size of the particular plates P. In the embodiment illustrated in the drawing, the complete web is shown as having a width made up of three of the plates P. This web is referred to in its entirety by the reference character W and is intended to completely cover the traction surface of a tire by extending circumferentially thereover. It will be noted that the opening 16 on the outer edges of the outer plates P will not carry any of the links 17 except at those points where provision is made for anchoring the web W to the wheel carrying the tire.

Referring for the moment more particularly to Figure 3, it will be noted that certain of the plates P at opposite sides of the web W have links 29 extending therefrom. An appropriate number of the links 29 may be employed to make up a chain, the extremities of which pass through recesses in the wheel so that they may be anchored to a cross strap 19 that extends across the inner face of the rim. Thus, the outermost link 29 at each side is received in a notch 20 that is formed in one arm of a yoke 21. The other arm of the yoke 21 passes through a recess 22 that is defined by the turned over end of strap 19. A retaining plate 23 is fitted over the ends of the arms of the yoke 21 and securely held in position thereon by nuts 24. This arrangement for securing the free link 29 at each side of the web is duplicated at the other end of the cross strap 19.

The above-described arrangement of the links 29 and cross straps 19 will ordinarily suffice to hold the web in effective position over the traction surface of the tire. However, under certain conditions it may prove desirable to further tension the web W over the tire. To this end certain of the plates P at the side edges of the web W may carry at appropriate intervals links 25. At each side there is a free link 25 which is adapted to have attached thereto one end of a tensioning spring 26, such as by the hook fastening device shown at 27. Each spring 26 is intended to extend diametrically across the wheel having one end hooked to a link 25 at one side and its other end hooked in a similar manner to a link 25 at the other. The tread plates P and links 17 are encased in rubber such as brought out in Figure 2, the rubber casing being designated 28.

It will be noted that the rubber extends up the ribs 13 and 14 to a point spaced from the free edges thereof, thus leaving the edges free for engagement with the road surface. The rubber is also continued down sufficiently far below the lower surface 11 to provide a cushion between the plates and the tire. Any appropriate rubber composition providing the desired properties of toughness and resiliency may be employed.

It is notable that this rubber partially fills the diamond-shaped recesses defined by ribs 13 and 14 which form V-shaped recesses, two of which are in inverted relation to each other, and due to the fact that the size and shape of these recesses will vary somewhat with rotation of the tire, it is important that the rubber be of a sufficiently yielding nature to accommodate this movement. It is also intended that the resilient property of the rubber be effective to eject foreign matter from the diamond-shaped recesses which ordinarily might become lodged therein due to use of the tire, and which, if left in the recesses, would clog the latter and interfere with the anti-skid performance of the chain.

As shown in Figure 3 this rubber 28 will be continued out beyond the side plates P at each side of the web W a slight distance, thus insuring that each plate P is completely encased except for the free edges of the ribs 13 and 14.

While a preferred specific embodiment of the invention is hereinbefore set forth, it is to be clearly understood that the invention is not to be limited to the exact construction illustrated and described, because various modifications of these details may be provided in putting the invention into practice, within the purview of the appended claims.

I claim:

1. An anti-skid chain of the character described comprising a plurality of transverse and longitudinal rows of tread plates, each of said tread plates carrying a V-shaped cross rib structure, the cross rib structure on one tread plate being inverted with respect to the cross rib structure of surrounding tread plates to define diamond-shaped recesses, and means for maintaining said tread plates in assembled relation to define a plurality of transverse and longitudinal rows of diamond shaped recesses.

2. An anti-skid chain of the character described comprising a plurality of tread plates, tread elements on each of said tread plates, links joining said tread plates to form a web, and a rubber casement encasing said tread plates and links and leaving a portion of said tread elements exposed.

3. An anti-skid chain of the character described comprising a web made up of a plurality of tread plates joined together in flexible relation by links, tread elements carried by each of said tread plates, a rubber casement encasing said tread plates and links leaving portions of said tread elements exposed, and means for anchoring said web about a tire.

4. An anti-skid chain of the character described comprising a web made up of a plurality of tread plates joined together in flexible relation by links, tread elements carried by each of said tread plates, a rubber casement encasing said tread plates and links leaving portions of said tread elements exposed, means for anchoring said web about a tire, and means for tensioning said web over said tire.

5. An anti-skid chain of the character described comprising a web made up of a plurality of tread plates joined together in flexible relation by links, tread elements carried by each of said tread plates, a rubber casement encasing said tread plates and links leaving portions of said tread elements exposed, means for anchoring said web about a tire, and spring means anchored to said web at diametrically opposite points to tension said web over said tire.

6. An anti-skid chain of the character described, comprising a plurality of circumferential rows of substantially square-shaped tread plates, each row of plates being pivotally connected to an adjacent row, a cross rib structure carried by each of said tread plates with the cross ribs following the diagonals of the square, portions of the cross rib structure on one plate cooperating with portions of the cross rib structure on the other plate to define a diamond-shaped recess, and means for maintaining said tread plates in assembled relation.

7. An anti-skid chain of the character described, comprising a plurality of circumferential rows of substantially square-shaped tread plates, each row of plates being pivotally connected to an adjacent row, a cross rib structure carried by each of said tread plates with the cross ribs following the diagonals of the square, portions of the cross rib structure on one plate being inverted with respect to the portions of the cross rib structure on the other plate to define a diamond-shaped recess, and means for assembling said tread plates in circumferential rows, said means permitting of a certain amount of movement therebetween.

8. An anti-skid chain of the character described, comprising a pair of substantially square-shaped tread plates, a cross rib structure carried by each of said tread plates with the cross ribs in intersecting relation and following the diagonals of the square, portions of the cross rib structure on one plate being inverted with respect to portions of the cross rib structure on the other plate to define a diamond-shaped recess, each of said tread plates being formed with an opening, and a link passing through said opening joining said plates together and permitting relative movement therebetween.

AUGUSTINE N. FRANCIS.